Sept. 29, 1936.   G. E. HALLENBECK   2,055,530
MACHINE TOOL
Filed July 6, 1931    4 Sheets-Sheet 2
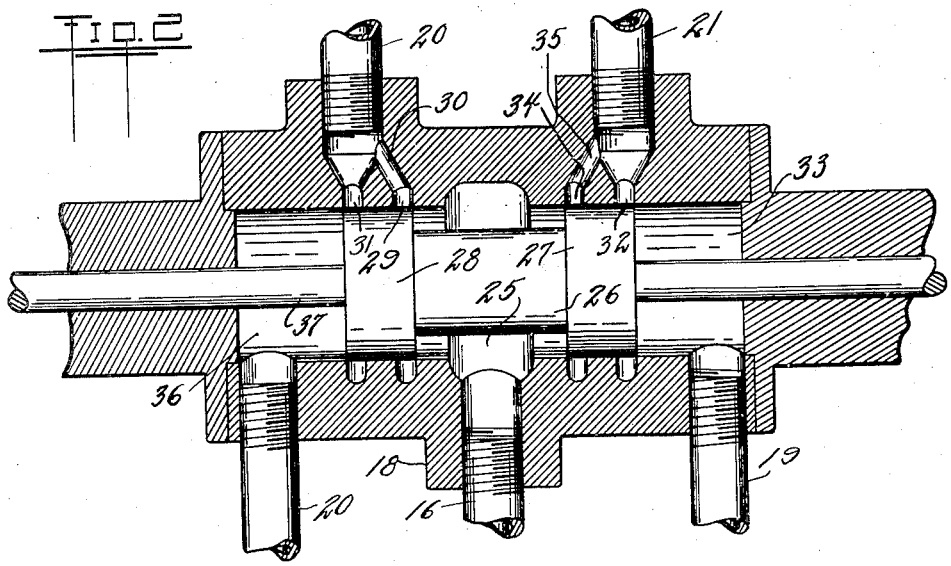
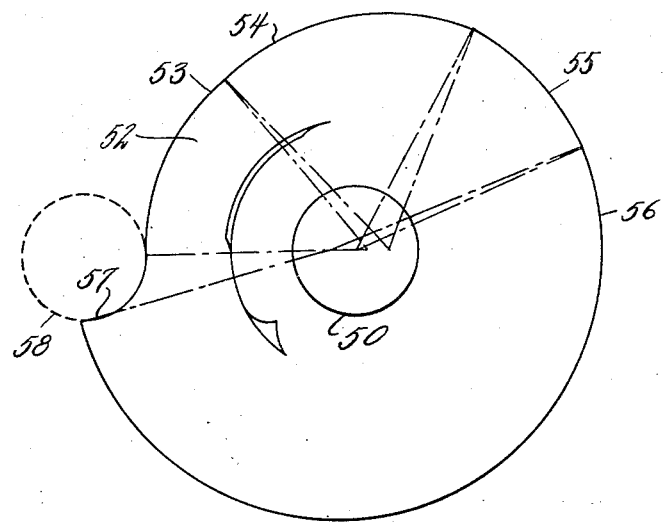
George E. Hallenbeck
Inventor

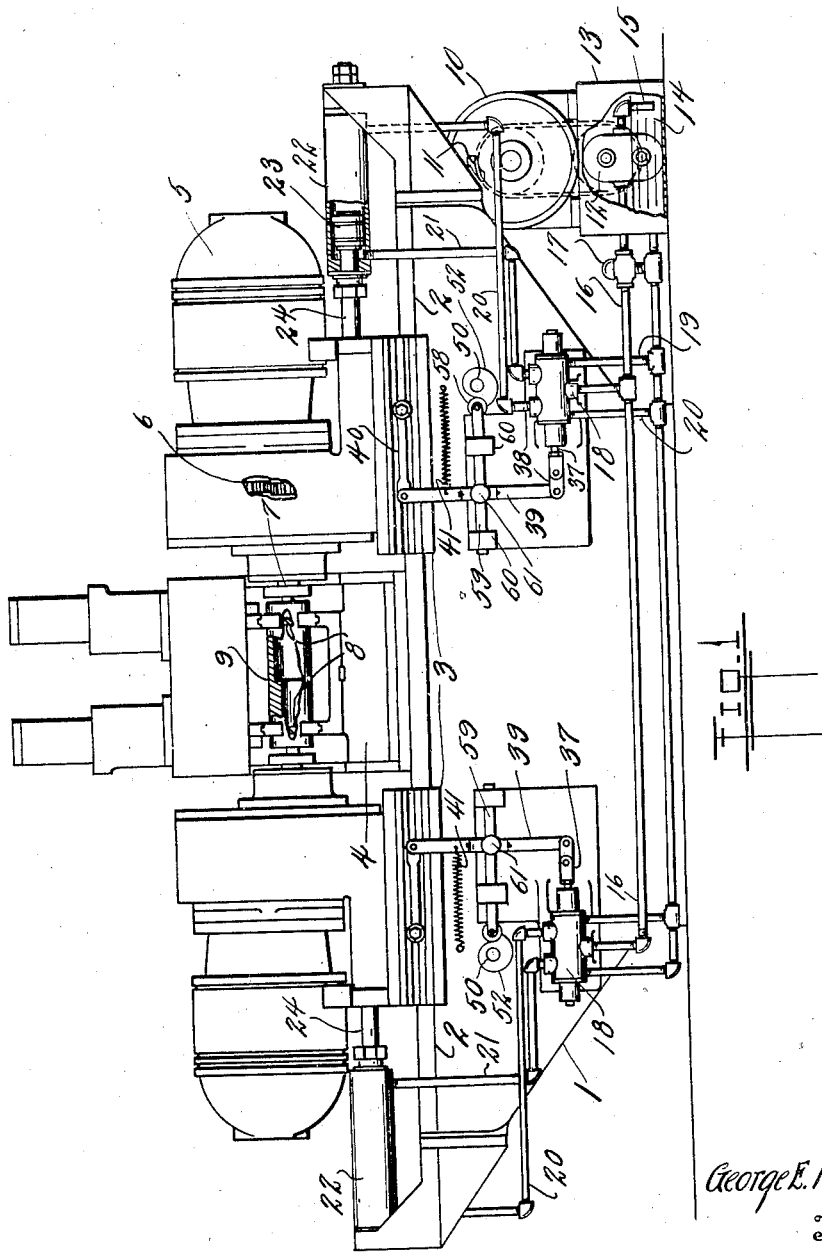

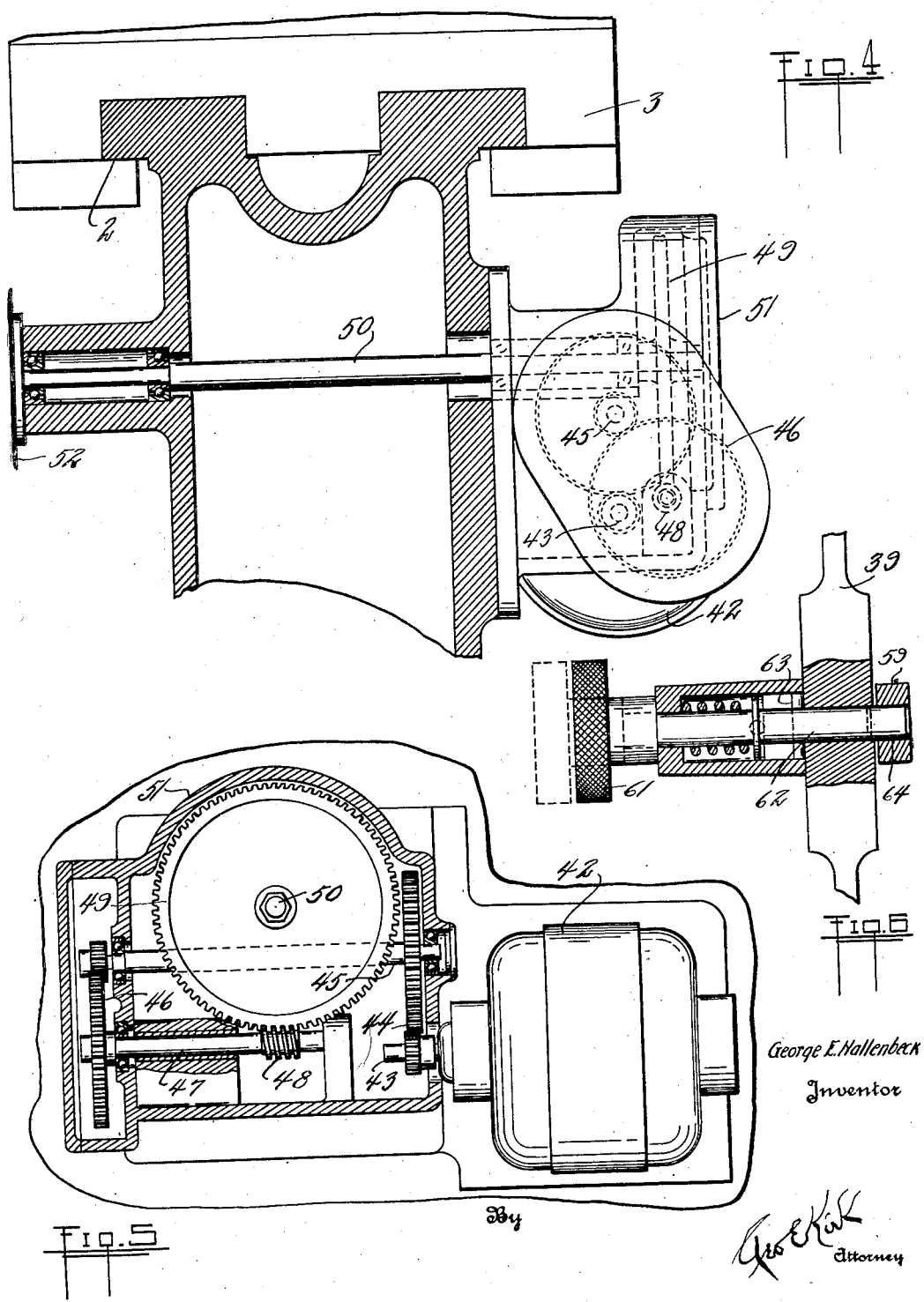

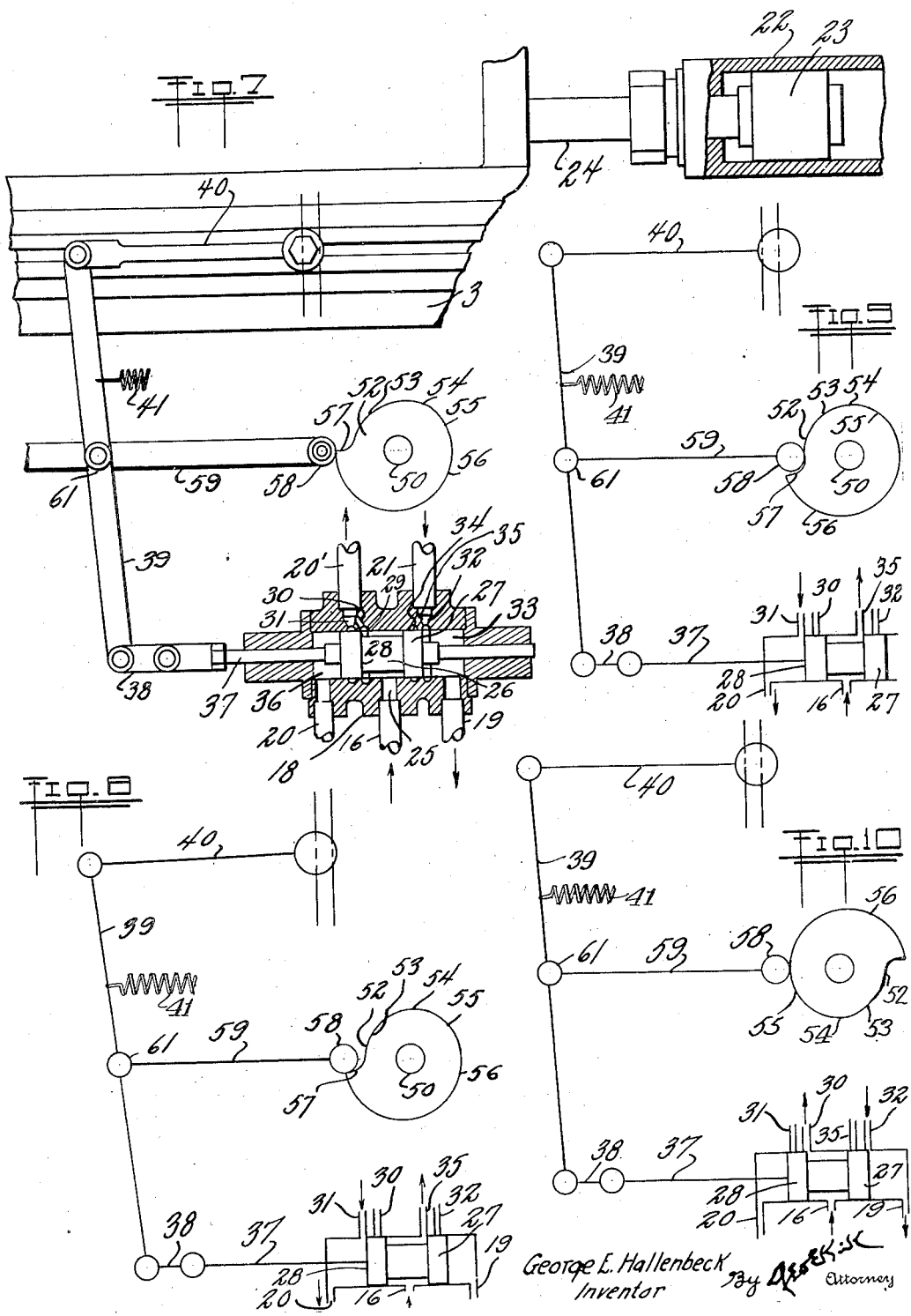

Patented Sept. 29, 1936

2,055,530

UNITED STATES PATENT OFFICE 2,055,530

MACHINE TOOL

George E. Hallenbeck, Toledo, Ohio, assignor to Baker Brothers, Inc., Toledo, Ohio, a corporation of Ohio Application July 6, 1931, Serial No. 549,082

2 Claims. (Cl. 121—45)

This invention relates to progressing and retracting a member hydraulically in a controlled cycle.

This invention has utility when incorporated in a machine tool power feed from a liquid power source, with a mechanical control for progress sequence as to speed and duration.

Referring to the drawings:

Fig. 1 is a side elevation, with parts broken away, of an embodiment of the invention in a horizontal boring machine;

Fig. 2 is a longitudinal section, on an enlarged scale, of the inter-line controller;

Fig. 3 is a side view of the cam influencing controller response to the machine operation;

Fig. 4 is a fragmentary view of features of the drive for the cam;

Fig. 5 is an additional view of features of the drive from the right of Fig. 4;

Fig. 6 is a detail view of the disconnector;

Fig. 7 is a fragmentary view showing the control connection between the valve past the cam for the work holder at the position of limit for the feed stroke;

Fig. 8 is a diagrammatic view of the mechanism of Fig. 7 exaggerated as to the port opening and showing the parts during the return stroke wherein the holder is being retracted from work position;

Fig. 9 is a diagrammatic showing exaggerated as to the port opening and showing the mechanism of Fig. 7 at the limit of the return stroke which is at the start of the feed stroke; and Fig. 10 is a diagrammatic view of the mechanism of Fig. 7 also exaggerated as to the port opening and showing the continuation of the feed stroke from the position shown in Fig. 9.

Machine tool frame 1 is shown provided with guides 2 for members 3 reciprocable toward and from intermediate work table 4. Motor 5 on the member 3 has gearing 6 for power transmission to holder 7 mounting tool 8 for operating upon work 9.

Motor 10 thru transmission 11 drives pump 12 in sump 13. Oil 14, or other hydraulic transmission medium, is withdrawn from the sump 13 by way of line 15. The pump 12 forces such liquid under pressure to flow along in line 16, past relief valve 17 to fitting of first valve part 18 at the inter-line controller. Return lines 19, 20, from this fitting 18 extend to the sump 13. From the fitting 18 lines 20', 21, extend respectively to the head end and piston rod gland end of cylinder 22 of the piston and cylinder device. In the cylinder 22 is piston 23 having piston rod 24 connected to the member 3 and extending in the direction of the guide 2 to be parallel therewith.

In the fitting 18 is chamber 25 to which the line 16 extends. This chamber 25 is at the region of reduced portion 26 of member or second valve part having piston or slide valve sections 27, 28. Slight movement of the member to the left in Fig. 2 places the pressure chamber 25 in communication with port 29, connected by cross duct 30 with port 31, from which the line 20' extends to the cylinder 22 to cause the piston 23 to force the piston rod 24 along the cylinder in the direction for shifting the member 3 toward the work table 4. This operation of the incompressible medium is permitted, for the opposite end of the cylinder 22 has the line 21 in communication with port 32 in the fitting 18. The valve section 27 has so moved as to open the port 32 into the chamber 33 for the liquid to flow back to the sump 13 by way of the line 19. In the instance of the valve section 27 shifting to open port 34 to the chamber 25, the port 34 is connected by cross duct 35 with the line 21 extending to the gland end of the cylinder 22 thereby to act upon the piston 23 to cause travel of the member 3 away from the work table 4. The spill or exhausting from the piston rod end of the cylinder 22 is by way of the line 20' to port 31 into chamber 36, for the valve section 28 is moved to open port 31. The chamber 36 is in communication by line 20 with the sump 13.

The slidable valve comprising the reduced intermediate section 26 and the enlargements 27, 28, has rod 37 extending thru the fitting 18 to short link 38 from which there is upwardly extending lever 39 connected by horizontal link 40 to the member 3. Spring 41 holds the floating lever 39 in a normal feed actuation position for the member 3. At a mid position for the slide valve 26, 27, 28, there is idle or no movement of the member 3. Even if there be seepage at the slide valves, such is distributed both ways and no operation follows therefrom. In practice the unbalancing for operation is brought about by very slight longitudinal movement of the rod 37. That movement which is sufficient to disturb the equilibrium determines the travel.

The influencing means which may be effective for following out in succession a plurality of cycles is herein shown as a uniform speed power device of synchronous or other constant speed type of motor effective as a constant for the period of the cycles. Motor 42 (Fig. 5) has its shaft 43 connected by speed reduction changeable speed gearing 44 with shaft 45 having second speed reduction spur gearing transmission connection 46 with shaft 47 carrying worm 48 in mesh with worm wheel 49 on shaft 50. These speed reduction gearings are in housing 51 mounted on the side of the frame 1 opposite from the interline controller in the housing 18. The cover for the housing 51 is readily removable for access to the gears on the shafts 45, 47, for transposing or substitution as quick slip change means for speed variation. The shaft 50 extends thru the frame 1 and terminally carries cam 52. The cam 52 is shown as a variable influencing means. Cam section 53 may coact for a constant or gradual uniform speed control; cam section 54 for a rapid speed increase or acceleration; cam section 55 for a dwell speed; cam section 56 for a different speed, and drop-off cam section 57 for the reversal. The cam section 57 accordingly positions the valve 27, 28, toward the right of chamber 33 (Fig. 2). This brings about travel of the piston 23 for a complete stroke to the right (as shown at the right in Fig. 1). Through the follow-up action herein disclosed, the floating lever is shifted as a result of such travel to return the valve 27, 28, to neutral position. The rotation of the cam brings about at its section 53 a gradual feed as distinguished from the return travel brought about by the section 57. It is thus seen that the feeding stroke may start slowly along the section 53 with such speed increased along the section 54 and, say as the tool is entering the work, the cam section 55 effects a dwell of the tool in this working relation. This stage may be followed by a further travel feed at the section 56. There may be occasion to restart the machine at each completion of the cycle, or the work table may so handle the work that step-up occurs for continuity of machine operation in a succession of cycles.

Roller 58 rides on the cam 52 and is mounted on bar 59, reciprocable in guides 60. With hand disk 61 pulled outward to clear stem 62 from the bar 59, it is in order to exert a manual external force in influencing the lever 39 for forward or retraction travel of the member 3 by the hydraulic power. When the disk 61 is manipulated to clear hold-out pin 63 so that the stem 62 again registers in opening 64 in the bar 59, the automatic power control is effective. Each axial shifting of the rod 37 is neutralized by the hydraulic connection to the piston and cylinder device causing the responsive travel of the member 3. But as the cam 52 may rotate at a desired slow speed, a new condition or a set of definite control conditions in sequence may be brought on before the member 3 halts at the end of its stroke. In fact, in practice, the progress is not halting or step by step, but smooth and definite as predetermined by the influencing means upon the controller.

It is to be understood there is herein a timed control. The operation is influenced or affected by the cam 52 for the performance of a cycle of operation in a definite period of time. The position of the valve 27, 28, is in practice just away from closure position at the operations and accordingly it hovers toward the closing position for the bar 59 to be effective initially while the influence from the link 40 is to operate the plunger 37 close to or at neutral position. This action is a differential follow-up for port closure in that at each shifting of the bar 59 there is the resultant influence through the link 40 to act on the plunger 37 in pulling the valves 27, 28, to restrict the port areas as exposed. Accordingly, the operation of the work holder is effective for the neutral positions while the cam travel is that for valve control. Any opening of the valve 27, 28, is immediately followed by a closing influence from the travel of the member 3 along the guide 2 for relocating the valve through the lever 39. The uniform speed motor 42 is in practice effective to give the cam 52 a constant speed which is herein a definite cycle prescribed in the time program for influencing the member to be reciprocated.

What is claimed and it is desired to secure by Letters Patent is:

1. A machine tool comprising a frame, a tool holder having slide bearing thereon, a piston and cylinder device connected to reciprocate the holder on the frame, valve means for the device, a lever provided with a link connection to the means, an additional link providing a connection between the lever and the holder for the valve means to respond to the reciprocation of the holder, a fulcrum for the lever mounted for movement relatively to the frame, a rotary cam for shifting the fulcrum, a constant speed motor on the frame, and speed reduction transmission therefrom to actuate the cam for modifying the response of the valve means to the holder.

2. A machine tool comprising a frame, a tool holder and a work holder on the frame, one of said holders having slide bearing with the frame, a piston and cylinder device connected to reciprocate said one holder on the frame, valve means for the device, a lever provided with a link connection to the valve means, a fulcrum for the lever mounted for movement relatively to the frame, a rotary cam for shifting the fulcrum, a constant speed motor on the frame providing a timing control, speed reduction transmission from the motor to actuate the cam to provide a timed cycle of shifting for the fulcrum to act on the lever, and an additional link providing a connection between the lever and the one holder.

GEO. E. HALLENBECK.